United States Patent [19]

Carpenter

[11] Patent Number: 4,976,382

[45] Date of Patent: Dec. 11, 1990

[54] QUICK RELEASE STRINGER

[76] Inventor: Jerry W. Carpenter, 503 Border, Orange, Tex. 77630

[21] Appl. No.: 390,098

[22] Filed: Aug. 7, 1989

[51] Int. Cl.[5] ............................................. A01K 65/00
[52] U.S. Cl. ....................................... 224/103; 43/55
[58] Field of Search .................... 43/53.5, 55; 224/103

[56] References Cited

U.S. PATENT DOCUMENTS

| 1,341,722 | 6/1920 | Putney | 224/103 |
|---|---|---|---|
| 2,470,941 | 5/1949 | Orton | 224/103 |
| 2,506,839 | 5/1950 | Mead | 224/103 |
| 2,800,263 | 7/1957 | Hunt | 224/103 |
| 2,958,977 | 11/1960 | May | 224/103 |
| 3,160,336 | 12/1964 | Flatford | 224/103 |
| 3,540,637 | 11/1970 | Ezell | 224/103 |
| 4,570,836 | 2/1986 | Mayo | 224/103 |
| 4,827,661 | 5/1989 | Wendler | 224/103 |
| 4,830,244 | 5/1989 | Brannon | 224/103 |

Primary Examiner—Kurt Rowan
Attorney, Agent, or Firm—Kenneth D. Baugh

[57] ABSTRACT

A fish stringer 10 is provided including a stringing needle 12 and a cord 20 coupled to the needle. A stop 22 is slidably coupled on the cord to rest adjacent a clip 26. The clip 26 is coupled to the cord 20 and can be selectively fastened and released to permit fish to be coupled onto and released from the cord.

4 Claims, 3 Drawing Sheets

QUICK RELEASE STRINGER

TECHNICAL FIELD

This invention relates to a fishing device and more particularly to a stringer for holding fish thereon after they are caught. Fishing is a very popular sport and recreational endeavor. Because of its popularity any accessory that makes the fishing experience more comfortable and convenient is welcomed. One device that helps the fishing experience is the article used for temporarily holding fish just after they have been caught. That is the stringer. One measure of the effectiveness of the stringer is the ease on which the fish can be placed thereon and the quickness in which the fish can be released from the stringer when desired.

There is an ongoing concern about improving the effectiveness of the stringer. What is desirable is a simple and in expensive apparatus that will allow easy stringing of fish while also allowing their subsequent quick release when desired.

BACKGROUND ART

Attempts have been made to provide effective stringers for fisherman. One such device is disclosed in U.S. Pat. No. 2,958,977. This device is known as a fish stringer and hook extractor. The device includes a needle for threading a cord through the fish and an implement for extracting a fishhook if necessary. An abutment means is releasably attached to one end of the cord to permit removal of the fish from the cord. Another arrangement is disclosed in U.S. Pat. No. 2,453,381. This device includes an elongated flexible rope and a means for removably retaining the rope. This allows the stringer to be readily secured in and released from its receiver to facilitate the stringing and securing of fish on the stringer.

These arrangements have realized some success. However there remains a need for a simple device which facilitates easy threading of fish onto a cord while affording the quickest possible release of the fish from the cord.

DISCLOSURES OF THE INVENTION

A fish stringer is provided including a stringing needle which is coupled to one end of a cord. A stop is slidably coupled on the cord. A first fastening means is provided for fastening the other end of the cord to a support member. A second fastening means is slidably mounted on the support member. The second fastening means is provided to cover the first fastening means and lockingly engage the support member so that the cord can be selectively fastened and released to permit fish to be coupled onto and released from the cord.

BRIEF DESCRIPTION OF THE DRAWING

The details of the invention will be described in connection with the accompanying drawing in which.

BEST MODE FOR CARRYING OUT THE INVENTION

Figure 1:
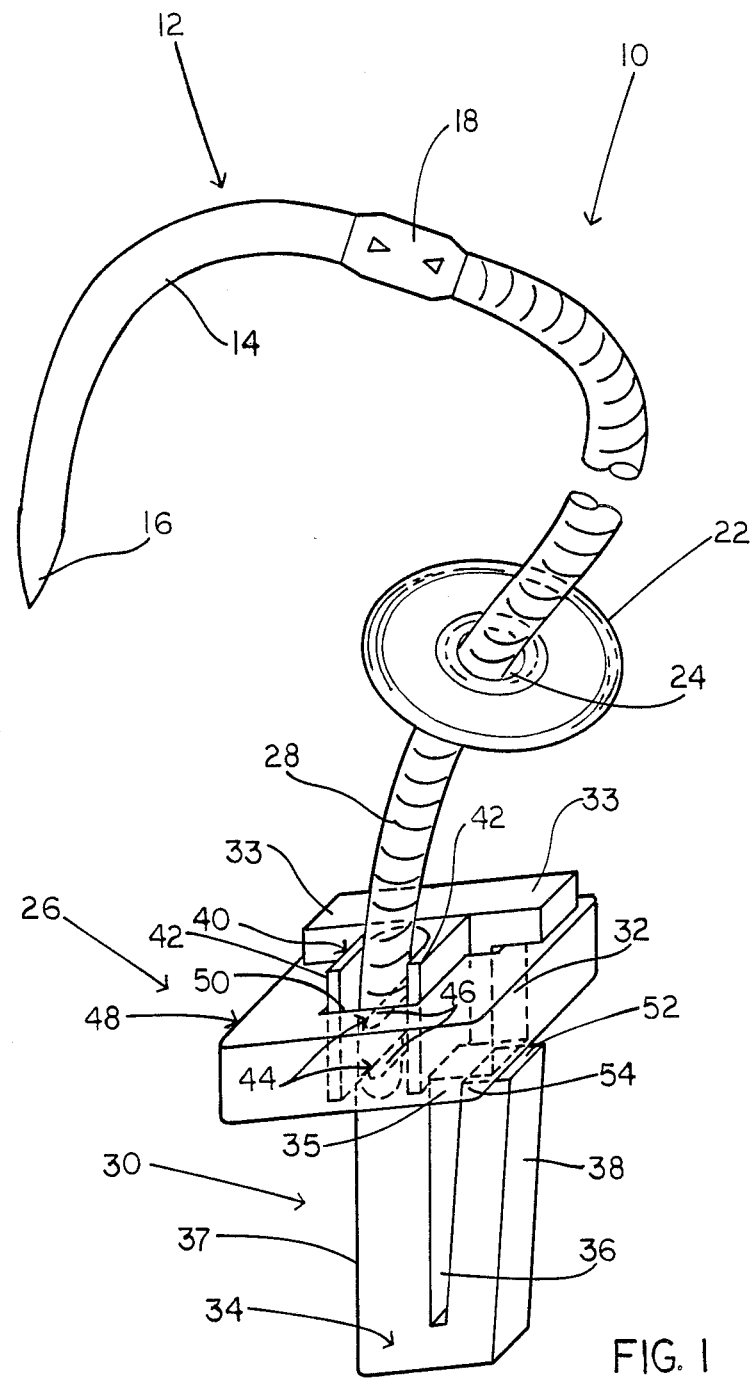
FIG. 1 is a perspective view illustrating the stringer in accordance with the principles of this invention.

Referring to FIG. 1 there is shown, a fish stringer, generally designated by the numeral, 10 in accordance with the principles of the invention. The fish stringer 10 includes a stringing needle, generally designated by the numeral, 12. The stringing needle 12 includes an elongated curved portion 14 having a pointed end member 16 and a coupling member 18. The coupling member 18 is provided to couple the stringing needle 12 to a cord or flexible member 20. The cord 20 is provided to be threaded through fish to hold them in place thereon. A circularly configured stop, generally designated by the numeral, 22 is provided having an aperture 24 formed therethrough. The stop 22 is threaded onto the cord through aperture 24. A fastener or clip member, generally designated by the numeral, 26 is coupled to an end 28 of the cord 20 opposite the stringing needle 12. The clip 26 is provided to hold the stop 22 and fish on the cord and to permit the release of the stop and fish from the end 28 of the cord when desired.

Figure 2:
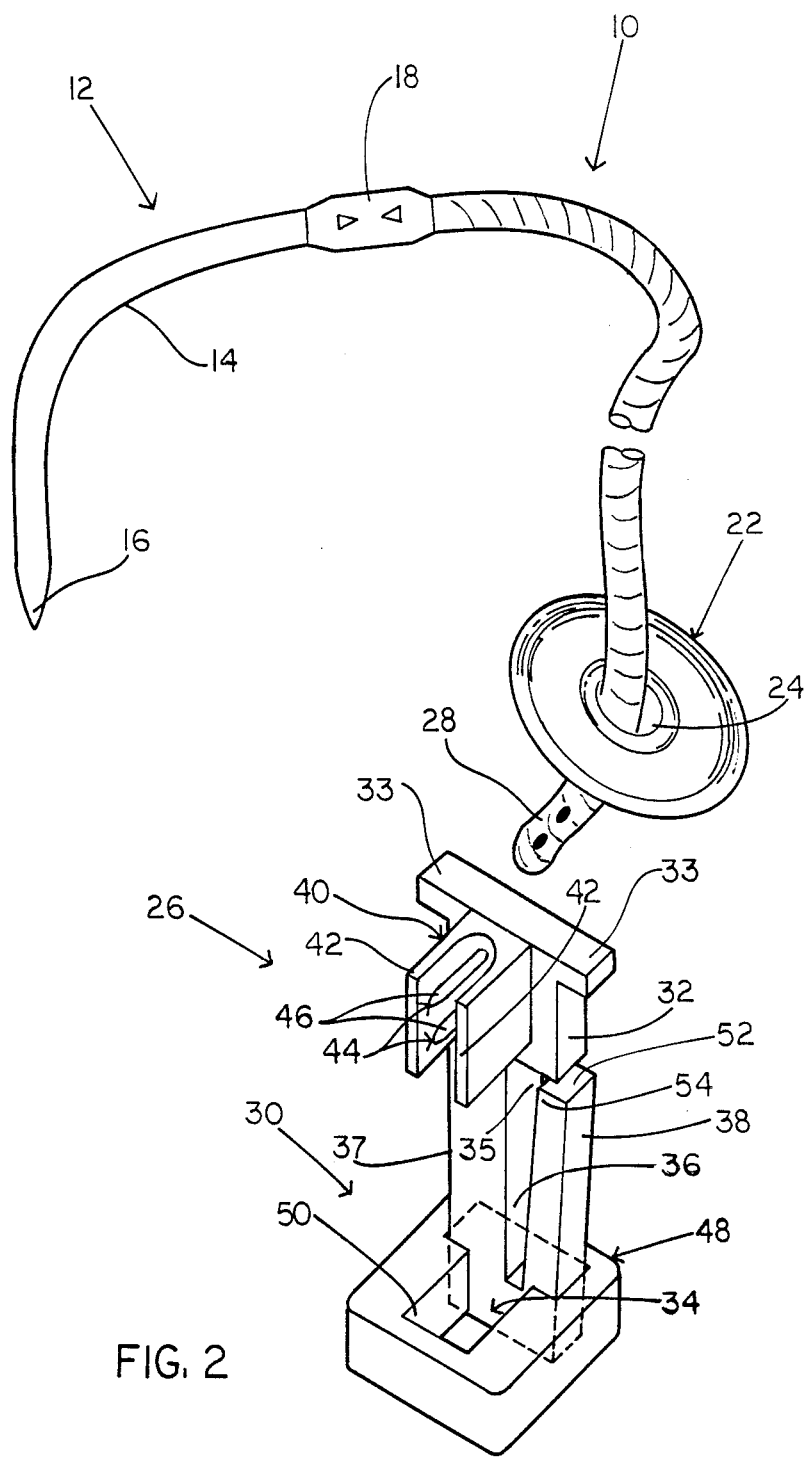
FIG. 2 is another perspective view illustrating the stringer in accordance with the principles of this invention.
Figure 3:
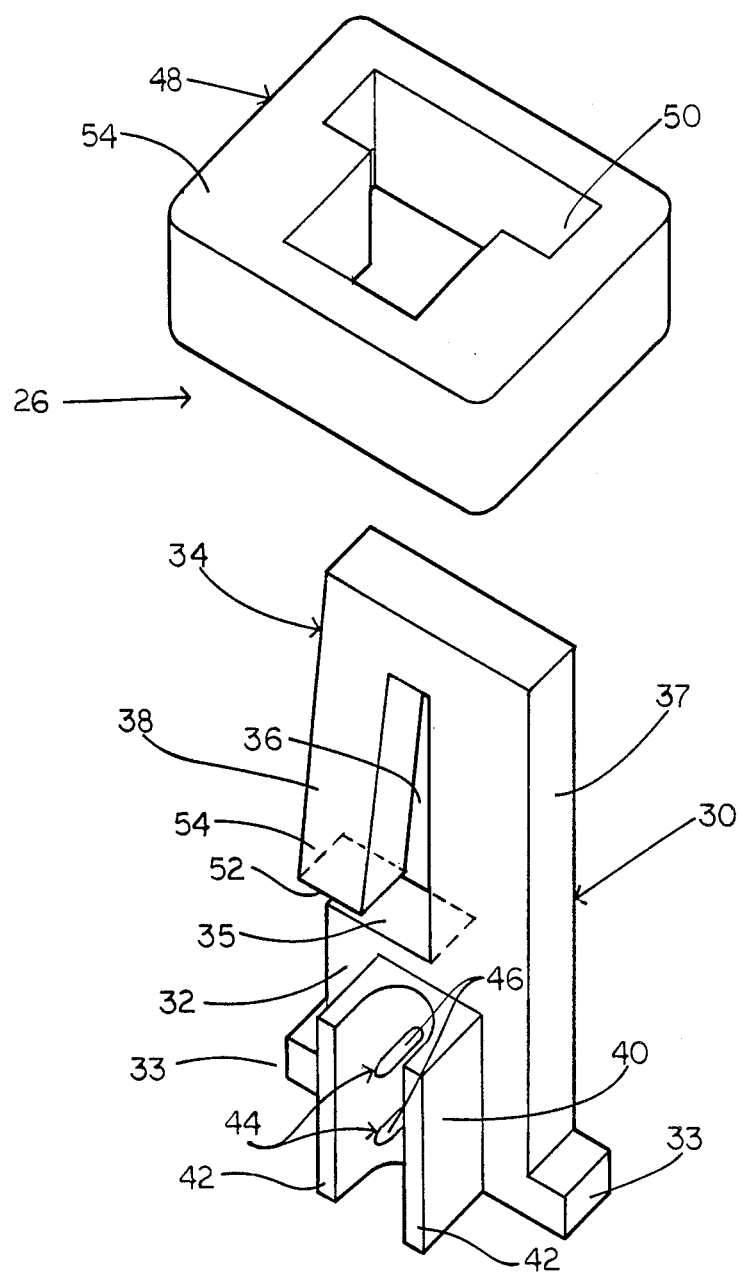
FIG. 3 is a perspective view illustrating a clip of the stringer in accordance with the principles of this invention.

Referring to FIGS. 1, 2 and 3 the clip 26 includes a planar support member, generally designated by the numeral, 30. The planar support member 30 is provided with an upper rectangularly shaped support portion 32. The rectangularly shaped support portion 32 includes protruding members 33 coupled on each side thereof. The planar support member 30 also includes a V-shaped lower support portion, generally designated by the numeral, 34. A V-shaped slot 36, is formed in the lower support portion 34. The slot 36 has an L-shaped open end 35 formed between the upper rectangularly shaped support portion 32 and the lower support portion 34. As a result a stationary member 37 and a movable leg 38 are formed. The movable leg 38 is movable in a spring biased fashion toward and away from the stationary member 37.

A cord support tray, generally designated by the numeral, 40 having upstanding walls 42 is coupled on the rectangularly shaped support portion 32 of the support member 30. A pair of holding barbs, generally designated by the numerals 44, are provided having pointed end member 46. The holding barbs 44 are provided to secure the end 28 of the cord 20 in the support tray 40. A fastening stop, generally designated by the numeral, 48 is provided (FIG. 3). The fastening stop 48, which is formed with a T-shaped aperture 50, is provided to cooperate with the planar support member 32 to lock the clip 26 in place on the cord 20.

When it is desired to lock the clip 26 on the cord 20 the stop is first threaded onto the end 28 of the cord (FIG. 5). The cord 20 is then placed in the tray 40 so that at least one of the barbs 44 will pass through the cord. This locks the cord 20 in the tray 40. The lower support portion 34 of the planar support 30 is then inserted through the aperture 50 in the fastening stop 48. The fastening stop 48 is then pulled up the support member 30 resulting in the leg 38 of the lower support portion 34 being pressed inwardly to allow continued movement. The fastening stop 48 is pulled up the support member 30 until the fastening stop 48 covers portions of the tray 40 and is abuted against the protruding member 33 of the rectangularly shaped support portion 32. At this point the spring biasing action of the movable leg 38 causes the leg to move out of the aperture 50 and an upper portion 52 of the leg will engage a lower portion 54 of the fastening stop 48. This locks the fastening stop 48 between the leg 38 and protruding members 33 thereby holding the stop in place over the tray 40. As a result the clip 26 is locked in place about the cord 20.

When in use fish (not shown) are threaded on the cord 20 by inserting the stringing needle 12 up through the fish guild and into the mouth so that the fish can slide down the cord. This process is continued until the desired number of fish are threaded on the stringer 10. When it is desired to release the fish from the stringer 10 the movable leg 38 of the lower support 36 is pressed inwardly so that it is aligned in the aperture 50 of the fastening stop 48. The fastening stop 48 can then be slide downwardly until the end 28 of the cord 20 is visible. The cord 20 can then be disengaged from the barbs 46 to remove it from the clip 26. The stop 22 can then be slide off the cord 20 thereby allowing the fish threaded on the cord to be removed also.

It should be understood that various changes and modifications can be made without departing from the spirit of the invention as defined in the claims.

What is claimed:

1. A fish stringer including:
   a stringing needle;
   a cord;
   means for coupling one end of the cord to the needle;
   a stop slidably coupled on the cord;
   a support member having an upper support portion having protruding members coupled to uppermost end portions thereof, a lower support portion having a stationary member coupled to the upper support portion and a movable member coupled to the stationary member; and
   first fastening means coupled to the support member for fastening the other end of the cord to the support member; and
   second fastening means slidable mounted on the support member for covering the first fastening means and for lockingly engaging the support member so that the cord can be selectively fastening and released to permit fish to be coupled onto and released from the cord.

2. A fish stringer as defined in claim 1 wherein the first fastening means includes:
   a support tray coupled to the upper support portion of the support member; and
   a holding barb for penetrating the other end of the cord coupled in the support tray.

3. A fish stringer as defined in claim 2 wherein the second fastening means includes a rectangular shaped stop having an aperture extending therethrough, the lower support portion of the support member being slidable through the aperture in the stop in one direction so that when the stop covers the support tray the movable leg of the support member will move outwardly to lock the stop between the movable leg and the protruding members of the upper support portion and thereby secure the cord in the tray and so that when the movable leg is moved inwardly into the aperture in the stop the lower support portion can be slidable through the aperture in the other direction to allow the release of the cord from the tray.

4. A fish stringer as defined in claim 3 wherein the first fastening means includes a second holding barb for engaging and penetrating the other end of the cord.

* * * * *